United States Patent
Weigold et al.

(10) Patent No.: US 6,388,409 B1
(45) Date of Patent: May 14, 2002

(54) ELECTRONICALLY COMMUTATABLE MOTOR

(75) Inventors: Thomas Weigold, Baden-Baden; Johannes Pfetzer, Buehl; Guenther Riehl, Buehlertal; Matthias Schmitz, Gifhorn; Gerta Rocklage, Bochum; Torsten Heidrich, Vaihingen/Enz, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/720,505
(22) PCT Filed: Apr. 20, 2000
(86) PCT No.: PCT/DE00/01235
§ 371 Date: Mar. 2, 2001
§ 102(e) Date: Mar. 2, 2001
(87) PCT Pub. No.: WO00/65709
PCT Pub. Date: Nov. 2, 2000

(30) Foreign Application Priority Data

Apr. 27, 1999 (DE) .......................... 199 19 035

(51) Int. Cl.[7] .............................................. H02K 13/00
(52) U.S. Cl. ....................... 318/439; 318/254; 318/807
(58) Field of Search ................................ 318/138, 254, 318/439, 738, 807, 810, 811, 813, 817

(56) References Cited

U.S. PATENT DOCUMENTS 6,051,952 A * 4/2000 Moreira et al. ............. 318/738
6,163,122 A * 12/2000 De Fillppis ................. 318/439

FOREIGN PATENT DOCUMENTS

DE 197 25 521 12/1998

OTHER PUBLICATIONS

Patent Abstracts of Japan, vol. 1997, No. 03, Mar. 31, 1997 & JP 08 289582 A (Matsushita Refrig Co. Ltd), Nov. 1, 1996.

* cited by examiner

Primary Examiner—Khanh Dang
(74) Attorney, Agent, or Firm—Kenyon & Kenyon

(57) ABSTRACT

An electronically commutatable motor is described, the stator field windings of which can be connected to a commutation frequency having a DC supply voltage to generate a rotating field for the permanent magnet rotor and can be disconnected from it, the field windings being switchable via semiconductor output stages which can be activated via control signals with the commutation frequency of a control unit and whose operating conditions change as a function of a specified or specifiable setpoint. The disadvantages of motors with pulse-width-modulated control of the field windings can be avoided with simplified motor control in that the DC supply voltage is supplied to a DC transformer whose output voltage for the semiconductor output stages with the field windings changes as a function of the setpoint and that the control unit fully activates the semiconductor output stages continuously with unclocked control signals with the commutation frequency independently of the setpoint.

7 Claims, 2 Drawing Sheets

ELECTRONICALLY COMMUTATABLE MOTOR

FIELD OF THE INVENTION

The present invention relates to an electronically commutatable motor, the stator field windings of which can be connected to a commutation frequency having a DC supply voltage to generate a rotating field for the permanent magnet rotor and can be disconnected from it. The field windings being switchable via semiconductor output stages which can be activated via control signals with the commutation frequency of a control unit and whose operating conditions change as a function of a specified or specifiable setpoint.

BACKGROUND INFORMATION

A control unit is generally connected to a motor of the above-mentioned type. The control unit activates the semiconductor switches of the semiconductor output stages with pulse-width-modulated control signals. The clock frequency of the clocked control signals is therefore in the high-frequency range while the commutation frequency of the control signals is a function of the design and speed of the motor and is thus substantially lower. The semiconductor output stages switch the applied DC supply voltage which, for example, is formed by the battery of the vehicle when such motors are used in motor vehicles. Changing the pulse width of the clock pulses of the clocked control signals controls the power and/or speed in such motors.

Various problems arise when such motors are used. Expensive semiconductor switches and driver circuits are required in the control unit and a high power dissipation occurs in it as well. This in turn results in an expense for cooling the semiconductors in the control unit. Since the control unit is directly coupled with the DC power supply, for example, the vehicle electrical system, high EMC interference signals are produced which necessitate elaborate interference suppression circuits. Various designs of the motor must be provided if DC supply voltages of different sizes are present. The expensive circuitry and the additional cooling expense make manufacture of the motor cost-intensive.

SUMMARY

An object of the present invention is to provide electronically commutatable motor which avoids the disadvantages of the conventional pulse-width-modulated activation of the field windings without increased control and cooling expense.

According to the present invention, this object is achieved in that the DC supply voltage is supplied to a DC transformer whose output voltage for the semiconductor output stages with the field windings changes as a function of the setpoint and that the control unit completely trips the semiconductor output stages by force, continuously and independently of the setpoint, using unclocked control signals having the commutation frequency.

In this design of the motor, the commutation and the power or speed change are divided and performed separately. The control unit only takes over the commutation while the power or speed adjustment is taken over by a DC transformer, the output voltage of which changes as a function of a specified or specifiable setpoint. The semiconductor output stages with the field windings are maximally tripped by force, continuously, by the control unit, so that the output voltage of the DC transformer is responsible for the power or speed change.

This results in a number of advantages for the electronically commutatable motor according to the present invention. The high-frequency, pulse-width-modulated clock pulses of the control signals for the semiconductor output stages are eliminated. Slower semiconductor switches and simpler driver circuits can be used. Stepping up the vehicle power supply voltage via the DC transformer results in a reduction of the motor current and accordingly the power dissipation in the semiconductor switches at a given motor power. The semiconductor switches can therefore be operated without elaborate cooling. Since the control unit is decoupled from the vehicle power supply, i.e., the DC supply voltage, via the DC transformer and high-frequency clocking in the control unit is no longer necessary, the result is a low EMC interference level resulting in a lower expense for interference suppression. The reduction to the commutation function makes it possible to implement the control unit without a microcomputer, and therefore it can also be used at higher temperatures. The DC transformer can also be controlled without a microcomputer; only the electronic switch with a possible driver and an easily constructed control circuit in the DC transformer are required.

According to one embodiment, the DC transformer is designed in a conventional manner with a smoothing choke, a smoothing capacitor, a decoupling diode and an electronic switch, the switch being operated at a clock frequency and the pulse width of the switching pulses changing as a function of the setpoint. It is also possible to use DC transformers that are designed and controlled in another manner. The feedback control may be designed in such a way that a controller for deriving the pulse width of the switching pulses for the electronic switch is assigned to the DC transformer, the setpoint and the output voltage of the DC transformer being supplied to the controller.

The dependence of the output voltage of the DC transformer on the setpoint can be implemented in such a way that as the setpoint increases or decreases, the pulse width of the switching pulses of the electronic switch and accordingly the output voltage of the DC transformer increases or decreases.

The power and/or speed of the motor change as the output voltage of the DC transformer changes.

According to another embodiment, the DC transformer offers additional possible variations in that the output voltage is greater or less than the DC supply voltage and that the increase or decrease in the output voltage of the DC transformer is a function of the increase or the decrease in the setpoint.

DETAILED DESCRIPTION

Figure 1:
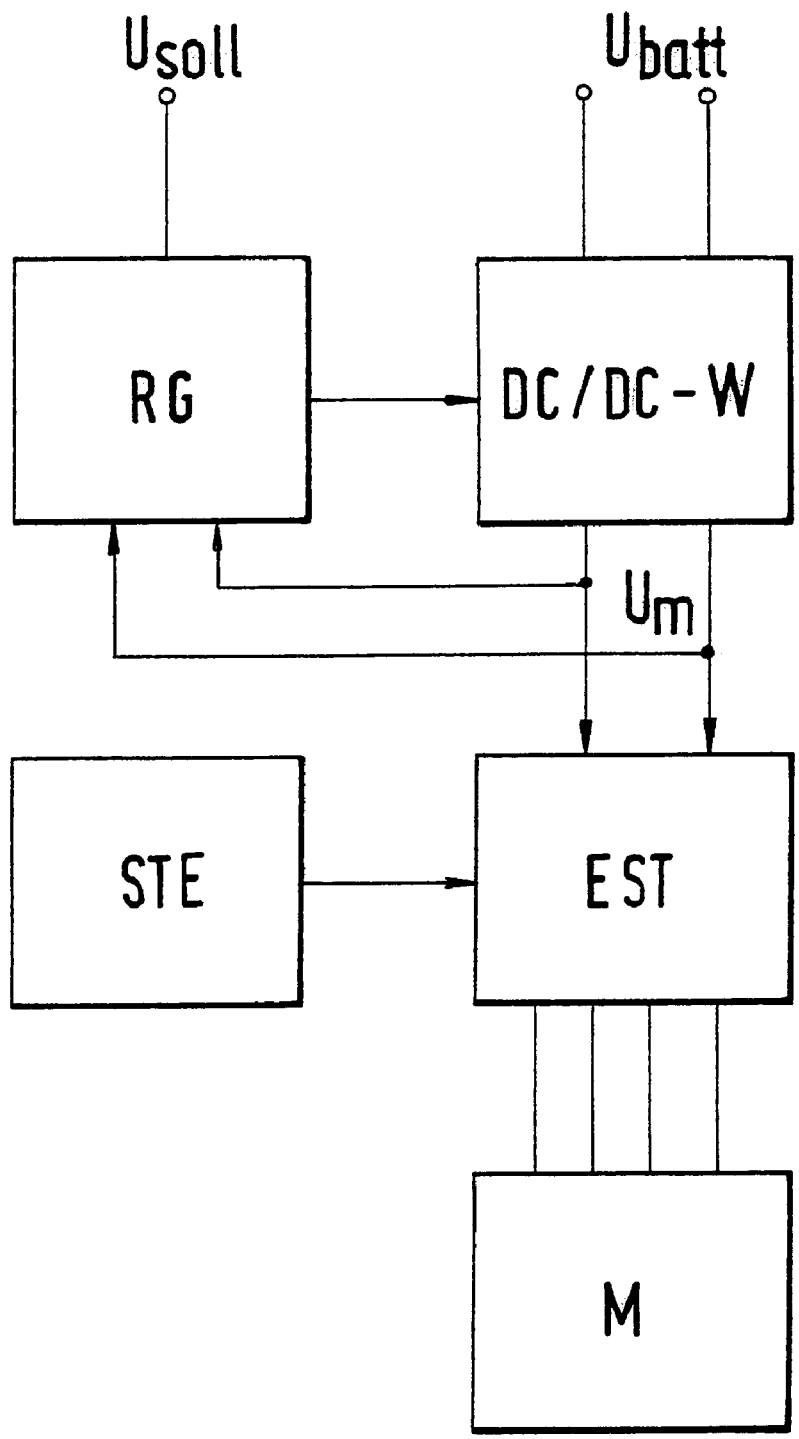
FIG. 1 shows a block diagram of the motor with DC transformer and a simple control unit.

As is shown in FIG. 1, DC supply voltage $U_{batt}$, e.g., the battery of a motor vehicle, supplies a DC transformer DC/DC-W which emits an output voltage $U_m$ as a function of a setpoint $U_{set}$ which is specified or specifiable by a controller RG. As setpoint $U_{set}$ increases or decreases, output voltage $U_m$ may increase or decrease. The dependence of output voltage $U_m$ on setpoint $U_{set}$ can be selected at random and determined by the control characteristic. The changing output voltage $U_m$ serves as the DC supply voltage for semiconductor output stages EST with the field windings of motor M. Semiconductor output stages EST of the motor are completely tripped by force, continuously during operation, by a control unit STE, so that the losses in the semiconductor switches of semiconductor output stages EST can be kept low. The control signals of control unit STE are no longer clocked and are only fed to semiconductor output stages EST with the commutation frequency. Therefore, the design of control unit STE is simple and requires no microcomputer as with conventional electronically commutatable motors with pulse-width-modulated control signals.

Figure 2:
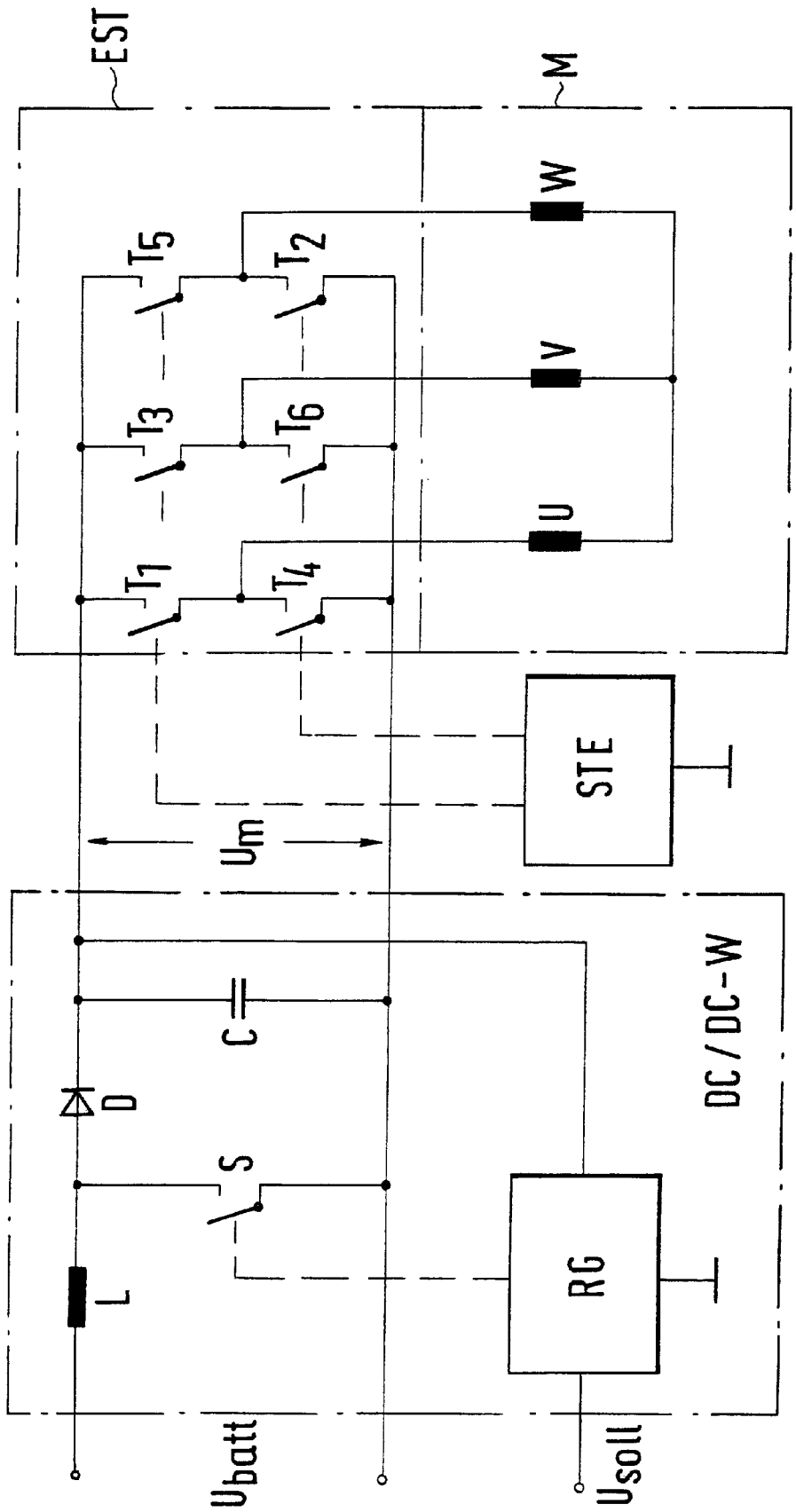
FIG. 2 shows a schematic circuit diagram of an embodiment of the motor according to FIG. 1.

An exemplary embodiment is explained in greater detail with reference to FIG. 2. DC transformer DC/DC-W includes a smoothing choke L, a smoothing capacitor C, a decoupling diode D and an electronic switch S. The principal function of such a DC/DC transformer is known. The clock frequency for electronic switch S may, for example, be 100 kHz. Via controller RG, the pulse-width ratio of the control signal for switch S as a function of setpoint $U_{set}$ and of output voltage $U_m$ of DC transformer DC/DC-W is tracked in such a way that output voltage $U_m$ is a multiple of setpoint $U_{set}$. $U_m$ may be selected to be greater or less than $U_{batt}$. Additional input variables for controller RG may be voltage $U_{batt}$ or the current from voltage $U_{batt}$ or the current from voltage $U_m$. Controller RG assures that a variable output voltage $U_m$ is derived from DC supply voltage $U_{batt}$ of the vehicle electrical system as a function of setpoint $U_{set}$, the variable output voltage being supplied as a variable supply voltage $U_m$ to semiconductor output stages EST with their semiconductor switches $T_1$ to $T_2$ (which are shown in simplified form as switches) and field windings U, V and W. This variable operating voltage for the motor brings about the power or speed adjustment. The free-wheeling diodes required for field windings U, V and W are not shown in FIG. 2 for reasons of simplicity. The high-frequency, clocked activation of semiconductors switches $T_1$ to $T_6$ is eliminated since the control signals of control unit STE with the commutation frequency take over the activation of semiconductor switches $T_1$ to $T_2$.

If, as in the exemplary embodiment, DC supply voltage $U_{batt}$ is stepped up, for example, from 12V to an operating voltage $U_m$ of, for example, 12V to 42V, then the current to be switched for field windings U, V and W can be reduced with the same motor output. This makes it possible to use simpler, more cost-effective semiconductors in semiconductor output stages EST. Since the control signals for semiconductor output stages EST are also no longer clocked at a high operating frequency, semiconductor switches with greater operating times may also be used. Moreover, DC transformer DC/DC-W decouples motor M from DC supply voltage $U_{batt}$ and this results in a substantially reduced EMC interference level.

The transformer principle of the DC/DC transformer may also be different and motor M may also be operated with different power and voltage values. DC transformer DC/DC-W may step down DC supply voltage $U_{batt}$ from, for example 42V to an operating voltage $U_m$ of 12V to 42V. The operating frequency for electronic switch S of DC transformer DC/DC-W may also be variable.

By appropriately adapting DC transformer DC/DC-W with controller RG and control unit STE with semiconductor output stages EST, the present invention can be configured for various designs of motor M with a varying number of field windings, it being possible to attain varying operating data of motor M by dimensioning the components.

What is claimed is:

1. An electronically commutatable motor, comprising:
    stator field windings configured to connect to a commutation frequency to generate a rotating field for a permanent magnet rotor;
    semiconductor output stages, the stator field windings being connected to and disconnected from the commutation frequency via the semiconductor output stages;
    a DC transformer, a DC supply voltage being supplied to the DC transformer, an output voltage of the DC transformer being supplied to the semiconductor output stages, the output voltage changing as a function of a setpoint; and
    a control unit that completely trips the semiconductor output stages continuously and independently of the setpoint using unclocked control signals having the commutation frequency.

2. The electronically commutatable motor according to claim 1, wherein the DC transformer includes a smoothing choke, a smoothing capacitor, a decoupling diode and an electronic switch, the switch being operated at a clock frequency using switching pulses, a pulse width of the switching pulses changing as a function of the setpoint.

3. The electronically commutatable motor according to claim 2, wherein as the setpoint increases or decreases, the pulse width of the switching pulses and the output voltage of the DC transformer increases or decreases.

4. The electronically commutatable motor according to claim 2, wherein a controller for deriving the pulse width of the switching pulses is assigned to the DC transformer, the setpoint and the output voltage of the DC transformer being supplies to the controller.

5. The electronically commutatable motor according to claim 1, wherein at least one of power and speed of the motor change as the output voltage of the DC transformer changes.

6. The electronically commutatable motor according to claim 1, wherein the output voltage is greater or less than the DC supply voltage, an increase or decrease in the output voltage being a function of the increase or decrease in the setpoint.

7. The electronically commutatable motor according to claim 2 wherein an operating frequency of the electronic switch is variable.

* * * * *